US006999503B1

(12) United States Patent
Vadde

(10) Patent No.: US 6,999,503 B1
(45) Date of Patent: Feb. 14, 2006

(54) PARTIAL RESPONSE SIGNALING FOR ORTHOGONAL FREQUENCY DIVISION MULTIPLEXING

(75) Inventor: Venkatesh Vadde, Irving, TX (US)

(73) Assignee: Nokia Mobile Phones Ltd., Espoo (FI)

( * ) Notice: Subject to any disclaimer, the term of this patent is extended or adjusted under 35 U.S.C. 154(b) by 791 days.

(21) Appl. No.: 09/704,086

(22) Filed: Nov. 1, 2000

Related U.S. Application Data

(60) Provisional application No. 60/229,571, filed on Aug. 31, 2000.

(51) Int. Cl.
H04B 1/38 (2006.01)

(52) U.S. Cl. ...................... 375/219; 375/263; 370/208; 370/210

(58) Field of Classification Search ................ 375/219, 375/222, 232, 263, 265, 262, 377; 370/208, 370/210
See application file for complete search history.

(56) References Cited

U.S. PATENT DOCUMENTS

| | | | | |
|---|---|---|---|---|
| 5,432,818 | A | * 7/1995 | Lou ........................... | 375/324 |
| 5,787,113 | A | * 7/1998 | Chow et al. ................ | 375/219 |
| 6,091,932 | A | * 7/2000 | Langlais ..................... | 725/111 |
| 6,175,551 | B1 * | 1/2001 | Awater et al. ............... | 370/210 |
| 6,597,745 | B1 * | 7/2003 | Dowling ..................... | 375/296 |
| 6,631,175 | B1 * | 10/2003 | Harikumar et al. ......... | 375/350 |
| 6,657,950 | B1 * | 12/2003 | Jones et al. ................. | 370/208 |
| 6,732,328 | B1 * | 5/2004 | McEwen et al. ............ | 714/795 |

OTHER PUBLICATIONS

Zhao Y et al: "Intercarrier Interference Compression in OFDM Communication Systems by Using Correlative Coding:" IEEE Communications Letters, vol. 2, No. 8, Aug. 1, 1998, pp. 214-216, XP000778114; IEEE, Piscataway, US; ISSN: 1089-7798 p. 214.
Zhao Y: "In-Band and Out-Band Spectrum Analysis of OFDM Communication Systems Using ICI Cancellation Methods"; Proceedings of 16th International Conference on Communication Technology (ICCT '00), vol. 1, Aug. 21-25, 2000, pp. 773-776, XP002204243; IEEE, Piscataway, NJ, USA, ISBN: 0-7803-6394-9.
Vadde V: PAPR Reduction by Envelope Stabilization Using Partial Response Signaling in OFDM Systems:; 2001 IEEE Radio and Wireless Conference, Aug. 10-11, 2001, pp. 197-201, xp002204244; ieee, pISCATAWAY, nj, usa. ; isbn: 07803-7189-5.

* cited by examiner

Primary Examiner—Young T. Tse
(74) Attorney, Agent, or Firm—Jubin Dana; Steven A. Shaw; Glenn Boisbrun

(57) ABSTRACT

The system includes a transmitter for generating a signal and a cyclic prefix, wherein the transmitter suppresses a plurality of sub-symbols of the signal to produce a partial response signal. A portion of the partial response signal is dropped and the resulting truncated signal is used to modulate a carrier signal. The carrier signal is transmitted to the receiver through a noisy channel. The receiver receives a noisy signal and recovers the carrier signal and, hence, the partial response signal from the noisy signal. The method includes selecting a cyclic convolver having predefined values, applying the cyclic convolver to a signal to produce a partial response signal, dropping a plurality of sub-symbols of the partial response signal, appending a cyclic prefix at a leading edge of the truncated partial response signal, and transforming the truncated partial response signal with the cyclic prefix to produce a time base signal that is used to generate a modulated carrier signal that is ready for transmission.

20 Claims, 2 Drawing Sheets

PARTIAL RESPONSE SIGNALING FOR ORTHOGONAL FREQUENCY DIVISION MULTIPLEXING

CROSS-REFERENCE

This application claims the benefit of U.S. Provisional Application No. 60/229,571, filed Aug. 31, 2000.

BACKGROUND

This invention relates to communication systems and, more specifically, to modulation techniques for communication systems.

Typical communication systems transmit information from one location or source to a second location or destination. The information travels from the source to the destination through a channel; this channel is typically a noisy channel. Thus, the channel introduces various forms of noise. The term "noise" is used herein to define various forms of signal corruption, such as interference, fading, attenuation, environmental impact, and electronic noise, that after the characteristics of a signal as it travels through a channel. Accordingly, the signal that is transmitted through the channel and received at a receiver is a combination of the transmitted signal and the effects of noise introduced by the channel as a result of travelling through the channel.

In a cellular communications system, one type of noise is called "interference". More specifically, there are at least two forms of interference in communication systems: co-channel interference (CCI) and inter-symbol interference (ISI). CCI arises in communication systems due in part to the fact that there are several transmitters in communication with the same receiving unit. The signal from one transmitter can interfere with the signal from another transmitter. Each transmitter is an omni-directional transmitter. However, a signal being transmitted from one transmitter can take several paths as the signal travels from the transmitter to the receiver. This leads to ISI, a form of self interference. For example, in a cellular communication system there are several mobile stations in communication with the same base station which often leads to CCI.

As indicated above, in a communication system information is transmitted through the channel from the source to the destination. The information is carried by a carrier signal that is modulated to contain or carry the information. Various forms of modulation are used for transmission of the information through the channel. Modulation is the process of varying the characteristic of a carrier according to an established standard or scheme; the carrier is prepared or "modulated" by the information to produce a "modulated" carrier signal that is transmitted by the source to the destination through the channel. For example, in a cellular communication system, modulation is the process of varying the characteristics of the electrical carrier as information is being transmitted. The most common types of modulation are Frequency Modulation (FM), Amplitude Modulation (AM), and Phase Modulation (PM).

One modulation technique currently used in the industry is called Orthogonal Frequency Division Multiplexing (OFDM). OFDM is one of the techniques for multicarrier modulation. Multicarrier modulation is a technique for modulating multiple carriers with different information, all of which are transmitted simultaneously or parallel in time. OFDM has high spectral efficiency as well as tolerance to multipath fading. As indicated above, transmitters are omni-directional and transmit in all directions. Thus, a signal emerging from a transmitter, or the source, can travel multiple paths to reach the receiver, or the destination. Accordingly, multipath fading occurs on a carrier signal's intensity, which results in alteration of the information being carried.

The efficiency of a system utilizing OFDM stems from the simultaneous or parallel transmission of several subcarriers in time. While this lowers the bit-rate on each of the subcarriers, it provides an "N"-fold increase in aggregate bit-rate, wherein "N" is the number of subcarriers. Additionally, because the low bit-rate signals hardly suffer any ISI and the subcarriers are orthogonal, it is possible to demodulate the subcarriers independent of each other. A conventional OFDM system comprises a set of sub-symbols X[k] transmitted in time using an Inverse Fast Fourier Transform (IFFT). The time-domain baseband signal can be represented as:

$$x[n] = \frac{1}{\sqrt{N}} \sum_{k=0}^{N-1} X[k] \cdot \exp\left(\frac{j2\pi kn}{N}\right), \quad n = 0, 1 \ldots N-1$$

Thus, the N-sample long transmitted OFDM symbol vector can be expressed as:

$$x_N = \text{IFFT}\{X_N\}$$

where, $x_N$ and $X_N$ are the time and frequency domain symbol vectors, respectively.

In a typical OFDM system, binary symbols or bit streams are encoded in the form of complex valued numbers. The complex valued numbers are drawn from an M-ary alphabet. The complex valued numbers are then used to modulate a set of orthogonal sub-carriers to generate a time-domain signal using an Inverse Discrete Fourier Transform (IDFT). The resulting baseband signal, which is usually complex valued, is quadrature modulated on a Radio Frequency (RF) carrier and transmitted through an air interface channel. The transmitted signal is corrupted by channel noise and dispersion before being received.

There are several problems associated with systems that utilize OFDM modulation techniques. For example, the channel is subject to fading due to multipath and path loss. Additionally, the channel suffers from ISI which poses a problem at the receiver when data has to be detected. Furthermore, manufacturers of devices that transmit and receive data are always faced with the challenge of increasing the amount of and the rate at which information can be transmitted over a finite bandwidth while overcoming signal loss due to channel noise.

Therefore, what is needed is a system and method for minimizing the impact of ISI and fading on OFDM systems as well as enhancing the bit-rate.

SUMMARY

A system and method are provided that minimize the impact of ISI and fading while allowing for an enhanced bit-rate. The system includes a transmitter for generating a signal and a cyclic prefix, wherein the transmitter suppresses a plurality of sub-symbols of the partial response signal to produce a truncated signal used to modulate a carrier signal to generate the signal, and a receiver in communication with the transmitter through a noisy channel for receiving a noisy signal and recovering the signal from the noisy signal by eliminating noise resulting from transmission through a noisy channel.

The method includes selecting a cyclic convolver having predefined values, applying the cyclic convolver to a signal to produce a partial response signal, wherein a portion of the partial response signal has near zero amplitude, dropping the portion of the partial response signal with near zero amplitude from the partial response signal to produce a truncated partial response signal, and appending a cyclic prefix at a leading edge of the truncated partial response signal.

An advantage of the present invention is that band-width gain is achieved without significant spectral expansion.

DETAILED DESCRIPTION

Figure 1:
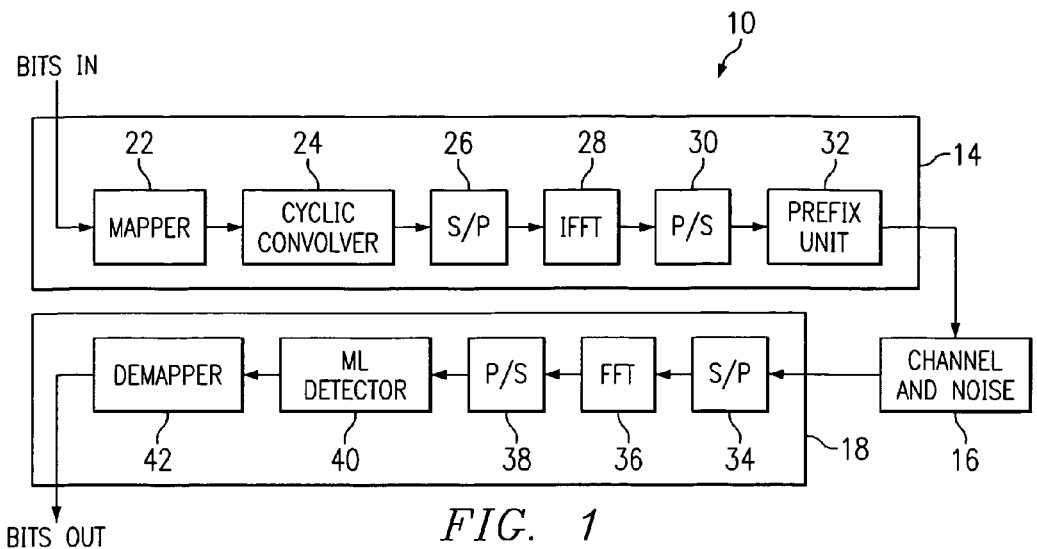
FIG. 1 is a block diagram illustration of a system with a partial response technique of Orthogonal Frequency Division Multiplexing (OFDM) in accordance with the teachings of the present invention.

Referring now to FIG. 1, a communication system 10 is shown having a transmitter 14, a channel 16, and a receiver 18, wherein the system 10 utilizes a Partial Response (PR)-Orthogonal Frequency Division Multiplexing (OFDM) signal modulation technique. The transmitter 14 includes a mapper 22, a cyclic convolver (also referred to as a "cyclic convolver unit" or "cyclic convolution unit") 24, a serial-to-parallel converter unit 26, an Inverse Fast Fourier Transform (IFFT) unit 28, a parallel-to-serial converter unit 30, and prefix unit 32. The transmitter 14 transmits the information to the receiver 18 through the channel 16. The channel 16 is a noisy channel. The receiver 18 includes a serial-to-parallel converter unit 34, a Fast Fourier Transform (FFT) unit 36, a parallel-to-serial converter unit 38, a Maximum Likelihood (ML) estimator unit 40, and a demapper unit 42.

Information in the form of binary signals are received at the transmitter 14 and inputted to the mapper 22 for mapping to or encoding in the form of a set of complex numbers drawn from an M-ary alphabet to produce a complex signal, which is then used to modulate or prepare a carrier signal for transmission as discussed in detail below. The transmitter 14 transmits the carrier signal through the channel 16 to the receiver 18. As the carrier signal, which is a time based signal, travels through the channel 16, the channel 16 introduces noise to the carrier signal, such as x[n], corresponding to a channel impulse response, such as h[n], of the channel 16. The cyclic convolver unit 24 performs a cyclic convolution on the complex signal. Additionally, the prefix unit 24 appends a cyclic prefix (CP) at the leading edge or the beginning of the complex signal that also helps compensate for the effects of the channel 16 and helps suppress Inter-Symbol Interference (ISI) in each of the low bit-rate sub-channels of the PR-OFDM signal.

The CP ensures that when the channel 16 performs a convolution on each OFDM time-symbol the effect of the channel 16 can be eliminated at the receiver 18. In a partial response (PR) technique, in accordance with the teaching of the present invention, inter-subcarrier (i.e., inter-channel) interference (ICI) is generated and introduced in the frequency domain based signal so as to shorten the effective time-domain symbol. The generated ICI is introduced to the complex signal by the cyclic convolver unit 24, as indicated above. The cyclic convolver unit 24 introduces, based on the desired or generated ICI, systematic or known amounts of dispersion to produce a partial response signal. In the system 10, the frequency symbol $X_N$ is subjected to a cyclic convolution by a known polynomial $c_N$ of order M, which is defined as follows:

$$c_N = [c(0) c(1) \ldots c(M-1) 0 0 \ldots 0]$$

The PR polynomial can be expressed as a zero-padded vector of length N with M non-zero terms. The resulting time-domain symbol vector can now be expressed as follows:

$$x_N = \text{IFFT}\{X_N \otimes c_N\}$$

where, $\otimes$ denotes cyclic convolution performed by the cyclic convolution unit 24, which disperses the information in each frequency-domain sub-symbol over M successive sub-carriers. Accordingly, the receiver 18 requires a sequence-detection mechanism to unravel the input sub-symbols $X_N$, and this is performed by the ML detector unit 40. Additionally, the other outcome of the cyclic convolution with $c_N$ is that the original time vector-symbol $x_N$ now bears an amplitude envelope given by the following:

$$e_N = \text{IFFT}\{c_N\}$$

By appropriately choosing the polynomial vector $c_N$, the transmitter 14 can effectively suppress energy in parts of the OFDM time symbol-vector, thereby producing a PR-OFDM symbol. For example, consider the set of polynomials obtained from the coefficients of powers of r in p(r), where:

$$p(r) = (1-r)^m; \, m=1, 2, \ldots$$

The envelope vector resulting from such a polynomial has a null at each of its extremities. Consequently, the energy at the extremities or the tails of the envelope of the time-domain symbol vector is effectively suppressed and can be dropped. Thus, the cyclic convolver unit 24 generates a partial response signal with near zero energy at the extremities in the time domain.

The partial response signal, which is a frequency domain based signal, is then received by the serial-to-parallel unit 26. The serial-to-parallel unit 26 converts the partial response signal from serial to parallel signalling and passes the parallel partial response signal to the IFFT unit 28. The IFFT unit 28 performs a modulation that is a transformation on the parallel partial response signal to generate real and imaginary components in the time domain. The transformed parallel partial response signal is derived from the partial response signal. The real and imaginary components of the transformed parallel partial response signal are received by the parallel-to-serial unit 30, which converts to serial signaling to produce a transformed partial response signal that is ready for transmission.

Figure 2:
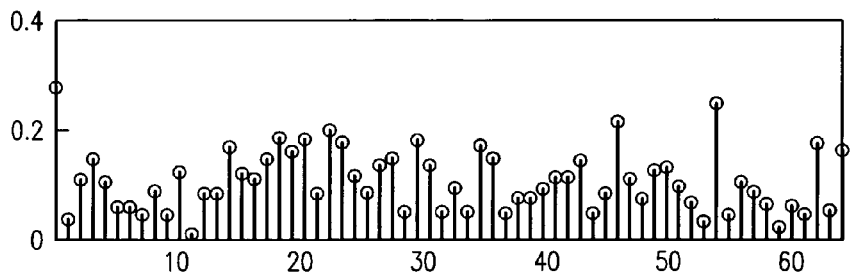
FIG. 2 is a graphical representation of an OFDM signal.

Referring now to FIGS. 2, 3, 4, and 5, the effect of the partial response generating polynomial on the time-domain symbol vector is illustrated on a 64-sample time-symbol. Referring specifically to FIG. 2, a 64-sample time-symbol is shown in absolute value of magnitude only, which is drawn from a set of randomly picked Quadrature Phase Shift Keyed (QPSK) sub-symbols in the frequency domain.

Figure 3:
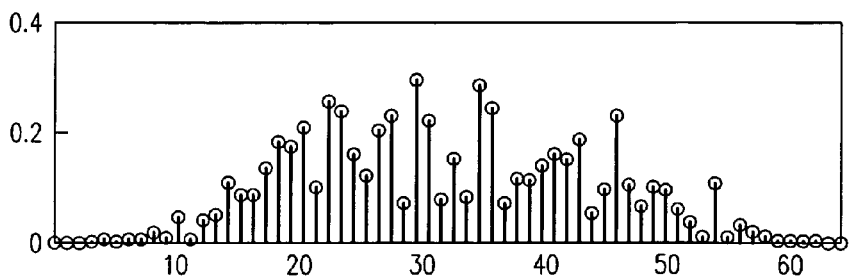
FIG. 3 is a graphical representation of a partial response OFDM signal altered by a preselected cyclic convulation polynomial.
Figure 4:
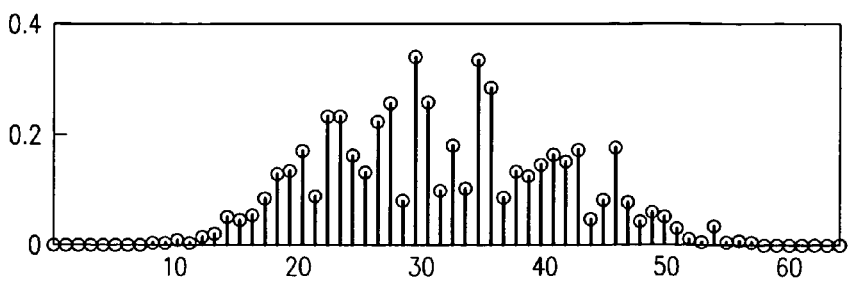
FIG. 4 is a graphical representation of a partial response OFDM signal altered by a preselected cyclic convolution polynomial.

Although FIG. 2 illustrates QPSK sub-symbols, any constellation can be used for the partial response signal. In FIGS. 3 and 4, the corresponding time-symbol magnitudes using a PR polynomial c of order M=2 and M=4, respectively, are illustrated with several of the samples of the time-symbol suppressed near the ends. Dropping the samples near the ends results in virtually no performance loss because the energy at the tails of this time-symbol is very low. The label "dropping" is used herein to mean that the sub-symbols are not transmitted as part of the transmitted partial response signal. Accordingly, dropping or not transmitting the low-energy samples essentially enables compression of the signal in time, thereby achieving significant time or bandwidth gains. Reducing the time taken to transmit an OFDM time-symbol because of the PR effects can be construed as leading to extra bandwidth.

In one embodiment, the system 10 is an OFDM system using 64 sub-carriers. The PR polynomial orders from M=1 to M=4 are utilized in the system 10. For M=1, 2, 3 and 4, d=12, 16, 24 and 32 samples, respectively, (i.e., 6, 8, 12, and 16 samples from each extremity) are dropped. Therefore, in the absence of any other performance loss in BER or SNR the fraction of time saved in communicating an OFDM time-symbol is d/N. Consequently, the time saved is 12/64, 16/64, 24/64 and 32/64 or 18.75%, 25%, 37.5% and 50% for M=1, 2, 3 and 4, respectively. Accordingly, the time saved can be used to transmit additional OFDM symbols and the corresponding bandwidth gain, which is measured as extra transmissions possible in a given amount of time, is 23%, 33%, 60% and 100%, for M=1, 2, 3 and 4, respectively.

As indicated, the bandwidth gain is achieved with minimum spectral expansion, which is discussed in detail below. It will be apparent to those skilled in the art that the OFDM signal $s_1(t)$ before insertion of the CP can be represented as follows:

$$s_1(t) = \sum_{k=-\infty}^{\infty} p_k\{t - kN \Delta T\} \quad (1)$$

where, N is the FFT-size, $\Delta T = T/N$, and $p_k(t)$ is the $k^{th}$ baseband OFDM symbol transmitted in $[(k-1)T, kT]$.

The $n^{th}$ sample, $s_1[n]$, of the signal is equal to $p_k[m]$, the $m^{th}$ sample of the pulse $p_k(t)$, where n=(m+kN). In one embodiment of PR signaling, d sub-symbols, wherein d is even, at the extremities are dropped from each OFDM symbol because the magnitudes of the dropped sub-symbols are relatively insignificant; dropping the sub-symbols from the OFDM signal produces a PR-OFDM signal in the time domain. In an alternative embodiment of PR Signaling, the sub-symbols dropped can be in any part of the PR signal. The PR-OFDM time-based signal therefore comprises symbols with (N−d) samples each, where the $k^{th}$ symbol contains a subset of samples from $p_k(t)$, specifically, the $(d/2+1)^{th}$ to $(N=d/2)^{th}$ sample. The PR-OFDM signal $s_2(t)$ can be expressed in terms of the pulse-train $p_k(t)$ as follows:

$$s_2(t) = \sum_{k=-\infty}^{\infty} p'_k\{t - k(N-d) \Delta T\}$$

where, the pulses $p'_k(t)$ and $p_k(t)$ are related as, $$p'_k(t) = p_k\left\{t + \left(\frac{d}{2}+1\right)\Delta T\right\} \cdot rect\left\{\frac{t}{(N-d)\Delta T}\right\}$$

where, $rect(t) = 1 \forall t \in [0, 1]$, and 0 otherwise.

The power spectral density (PSD) of the pseudo random signal represented by equation (1) can be computed from the auto correlation function of $s_1(t)$. Clearly, the auto correlation of $s_1(t)$ is confined to the interval $[-N\Delta T, N\Delta T]$. This follows from the confinement in time of $p_k(t)$ itself to $[0, N\Delta T]$, and from the fact that different OFDM symbols are zero-mean as well as uncorrelated. Auto correlation of $s_1(t)$ is the sample as that of the ensemble of pulses $p_k(t)$ i.e., $R_s(t) = R_p(t)$. The pulses $p'_k(t)$ are derived from $p_k(t)$, thus, it follows that:

$$R_{p'}(t) = R_p(t) \cdot rect\left\{\frac{t}{2(N-d)\Delta T}\right\}$$

Figure 5:
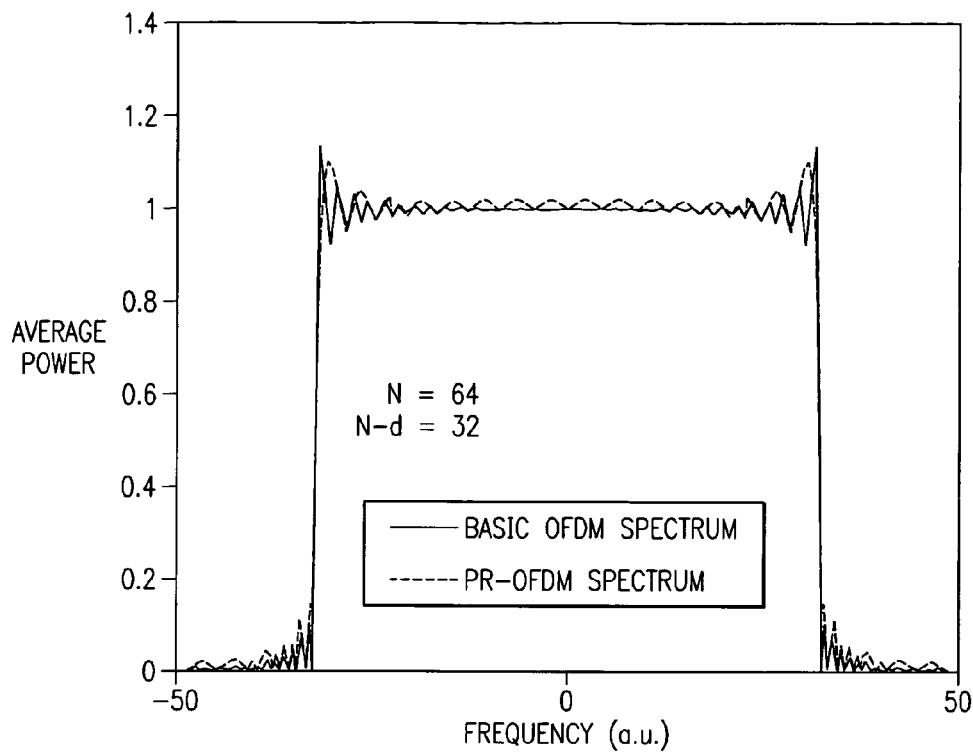
FIG. 5 is a graphical representation of average power plotted as a function of frequency.

Thus, the PSD $S_{p'}(f)$ of the continuous-time PR-OFDM signal $s_2(t)$ is related to the PSD $S_p(f)$ of the regular OFDM signal $s_1(t)$ in equation (1) as follows:

$$S_{p'}(f) = FT\{R_{p'}(t)\} = FT\left\{R_p(t) \cdot rect\left(\frac{t}{2(N-d)\Delta T}\right)\right\} \quad (1.1)$$
$$= (2(N-d)\Delta T)S_p(f) * sinc(2(N-d)f\Delta T) \propto$$
$$S_p(f) * sinc(2(N-d)f\Delta T)$$

where, * denotes convolution. For M=4, the value of $d \approx N/2$, implying the bandwidth increases by a factor sinc(fT). The impact of this factor, in the frequency domain, for the case M=4 and the choice d=N/2 is shown in FIG. 5 against the backdrop of the normal OFDM spectrum of FIG. 5. Accordingly, the spectral expansion is negligible compared to the large bandwidth gains possible through PR-OFDM.

The PR-OFDM signal has parts of the time-symbol suppressed. The cyclic convolution polynomial is selected so that the suppressed parts lie towards the extremities of the time-symbol, even though a polynomial could be selected to suppress any portion of the OFDM, such as the middle portion. In the present embodiment, the suppression occurs at the extremities of the time-symbol. With the extremities of the time domain symbol suppressed, a CP can be added without interference from the signal itself. The length of the CP to be appended is usually fixed as the maximum channel length, L, to be encountered. At the receiver 18, the CP bears all of the ISI and is simply dropped for detection purposes, as will be discussed in detail below. Thus, an orthogonal choice of subcarriers with a CP provide a multicarrier technique free of ISI and inter-subcarrier (i.e., inter-channel) interference (ICI). The cyclic-prefix or CP by definition is chosen to be the last L samples of the symbol and is appended to the beginning. For PR-OFDM in our case, we will always use an order of PR polynomial such that the number of suppressed sub-symbols satisfies d/2>L. Thus, the CP will simply consist of L blank (i.e., all-zero) sub-symbols appended to the truncated symbol $p'_k[n]$. It is an added advantage therefore that the CP used in PR-OFDM can have little or no energy.

The partial response signal is transmitted through the channel 16 and received at the receiver 18 as a transmitted partial response signal. The transmitted partial response signal is received at the serial-to-parallel unit 34 and converted to a parallel transmitted partial response signal and passed to the FFT unit 36. The FFT unit 36 performs the inverse transformation of the transformation performed by the IFFT unit 28 and, hence, transforms the signal from a time domain based signal to a frequency domain based signal to produce a converted parallel transmitted partial response signal. The converted parallel transmitted partial response signal is passed to the parallel-to-serial unit 38. The parallel-to-serial unit 38 changes the converted parallel transmitted partial response signal to a converted transmitted partial response signal. The converted transmitted partial response signal is passed to a maximum likelihood (ML) detector unit 40. The ML unit 40 unravels the converted transmitted partial response signal to produce or recover the complex-number based signal. The demapper unit 42 converts the complex-number based signal into a binary stream that is outputted from the receiver.

Figure 6:
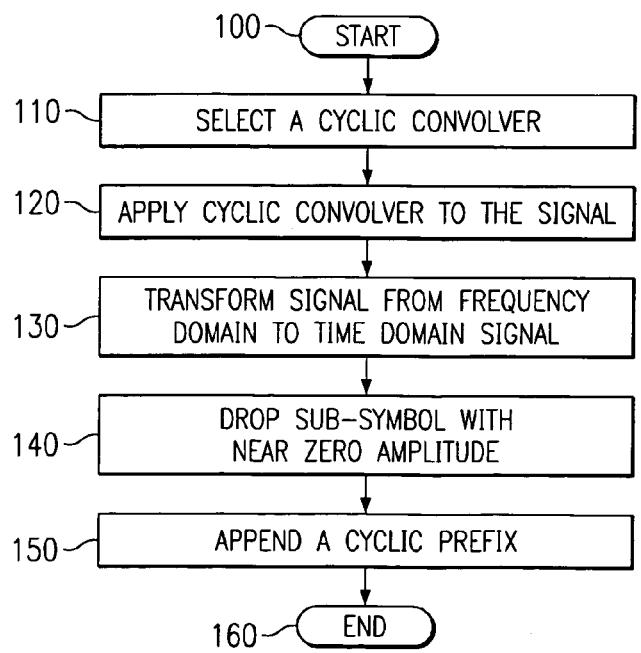
FIG. 6 is a flow chart of the process of generating the partial response OFDM signal using the system of FIG. 1.

Referring now to FIG. 6, the process of generating a PR-OFDM signal begins at step 100. At step 110, a cyclic convoler is selected that reduces the extremity sub-symbols to near zero amplitude. At step 120, the cyclic convoler is applied to the signal to generate a convoled signal. At step 130, the signal is transformed from the frequency domain to the time domain. At step 140, the near zero amplitude sub-symbols of the convolved signal are dropped to produce a PR-OFDM signal. At step 150, a cyclic prefix is appended to the PR-OFDM signal and the process ends at step 160.

Although described in the context of particular embodiments, it will be apparent to those skilled in the art that a number of modifications to these teachings may occur. Thus, while the invention has been particularly shown and described with respect to one or more preferred embodiments thereof, it will be understood by those skilled in the art that certain modifications or changes, in form and shape, may be made therein without departing from the scope and spirit of the invention as set forth above and claimed hereafter.

What is claimed is:

1. A communication system, comprising:
a transmitter for generating a signal, the transmitter having a mapping unit for mapping an input bit stream to a complex number domain, a cyclic convolver coupled to the mapping unit for generating a partial response signal, wherein the transmitter suppresses a plurality of sub-symbols of the partial response signal to produce a truncated partial response signal in a time domain, and the transmitter having a prefix unit for appending a cyclic prefix for a leading edge of the truncated partial response signal, the truncated partial response signal to which the cyclic prefix is appended, used to modulate a carrier signal to generate the signal; and
a receiver in communication with the transmitter through a noisy channel for receiving a noisy signal, wherein the receiver recovers the signal from the noisy signal by eliminating noise resulting from transmission through the noisy channel.

2. The system of claim 1, further comprising a transform unit for converting the partial response signal to a time domain signal and suppressing the plurality of sub-symbols.

3. The system of claim 1, wherein the receiver comprises a detector unit for recovering the signal from the noisy signal.

4. The system of claim 1, wherein the suppressed plurality of sub-symbols is distributed evenly at the edges of the partial response signal.

5. A method for increasing bit-rate through effective bandwidth gain in a system utilizing an orthogonal frequency division multiplexing technique, the method comprising:
selecting a cyclic convolver having predefined values;
applying a signal to the cyclic convolver to produce a partial response signal having a plurality of sub-symbols, wherein the values of the cyclic convolver are selected such that a portion of the plurality of sub-symbols of the partial response signal is reduced to near zero amplitude;
dropping the portion of the plurality of sub-symbols with near zero amplitude from the partial response signal to produce a truncated partial response signal in a time domain; and
appending a cyclic prefix at a leading edge of the truncated partial response signal.

6. The method of claim 5, further comprising:
transforming the partial response signal using an inverse fast Fourier transformation technique to produce a time based signal through a noisy channel; and
recovering the time based signal from the noisy channel at a receiver.

7. A system for delivering information from a source to a destination, the system comprising:
means for generating a frequency domain signal having a plurality of sub-symbols having near zero amplitude by performing a cyclic convolution on the information;
means for transforming the frequency domain signal to a time domain signal;
means for dropping the plurality of sub-symbols having near zero amplitude to produce a truncated time domain signal, wherein the means for dropping is coupled to the means for transforming; and
means for appending a cyclic prefix to a leading edge of the truncated time domain signal.

8. The system of claim 7, further comprising:
means for delivering the truncated time domain signal from the source to the destination, wherein the means for delivering is coupled to the means for dropping; and
means for receiving the delivered truncated time domain signal, wherein the means for receiving is coupled to the means for delivering and wherein the means for receiving comprises:
means for recovering a received truncated time domain signal from the delivered truncated time domain signal, wherein the received truncated time domain signal represents the truncated time domain signal; and
means for transforming indications of the received truncated time domain signal to a received frequency domain signal, wherein the means for transforming the indications of the received truncated time domain signal is coupled to the means for recovering and wherein the received frequency domain signal represents the frequency domain signal.

9. The system of claim 8, further comprising means for recovering a received information from the received frequency domain signal, wherein the means for recovering is coupled to the means for transforming indications of the received truncated time domain signal and wherein the received information represents the information.

10. An apparatus for a transmitter operable to generate a signal for communication upon a noisy channel, the apparatus comprising:
a mapper for mapping an input bit stream to a complex number domain;
a cyclic convolver and a transform unit coupled to the mapper for generating a partial response signal, wherein a plurality of sub-symbols of the partial response signal is suppressed to produce a partial response truncated signal in a time domain; and a prefix unit for appending a cyclic prefix for a leading edge of the partial response truncated signal, the partial response truncated signal to which the cyclic prefix is appended is used to modulate a carrier signal to generate the signal for communication upon the noisy channel.

11. The apparatus of claim 10, wherein the cyclic convolver performs a cyclic convolution on the complex number domain to produce the partial response truncated signal.

12. The apparatus of claim 10, wherein the cyclic convolver performs a cyclic convolution on the complex number domain employing a known polynomial vector.

13. The apparatus of claim 10, wherein a portion of the plurality of sub-symbols of the partial response signal has near zero energy.

14. The apparatus of claim 10, wherein a portion of the plurality of sub-symbols of the partial response signal has near zero amplitude.

15. The apparatus of claim 10, further comprising a serial-to-parallel unit that converts the partial response truncated signal into a parallel format.

16. The apparatus of claim 10, further comprising an inverse Fast Fourier transform unit that generates real and imaginary components in a time domain of the partial response truncated signal.

17. The apparatus of claim 10, further comprising a parallel-to-serial unit that converts the partial response truncated signal into a serial format.

18. The apparatus of claim 10, wherein the cyclic prefix is appended substantially free of interference with the partial response truncated signal.

19. The apparatus of claim 10, wherein the noisy channel is subject to interference and fading.

20. The apparatus of claim 10, wherein the apparatus employs a partial response orthogonal frequency division multiplexing signal modulation technique.

* * * * *